US012749795B2

(12) United States Patent
Liao et al.

(10) Patent No.: US 12,749,795 B2
(45) Date of Patent: Sep. 29, 2026

(54) ANTENNA STRUCTURE AND ELECTRONIC DEVICE

(71) Applicant: Wistron NeWeb Corp., Hsinchu (TW)

(72) Inventors: Guan-Hao Liao, Hsinchu (TW); Chin-Tang Huang, Hsinchu (TW); Yen-Ming Hong, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 16 days.

(21) Appl. No.: 19/009,089

(22) Filed: Jan. 3, 2025

(65) Prior Publication Data

US 2026/0121276 A1 Apr. 30, 2026

(30) Foreign Application Priority Data

Jan. 24, 2024 (TW) ................................ 113102732

(51) Int. Cl.
*H01Q 1/22* (2006.01)
*H01Q 1/48* (2006.01)
*H01Q 5/30* (2015.01)

(52) U.S. Cl.
CPC ................ *H01Q 1/22* (2013.01); *H01Q 1/48* (2013.01); *H01Q 5/30* (2015.01)

(58) Field of Classification Search
CPC H01Q 1/38; H01Q 1/241; H01Q 1/24; H01Q 1/22; H01Q 1/48; H01Q 5/30; H01Q 5/00; H01Q 9/0407; H01Q 9/42
See application file for complete search history.

(56) References Cited

U.S. PATENT DOCUMENTS

| | | | | |
|---|---|---|---|---|
| 11,342,670 | B1 * | 5/2022 | Yang | H01Q 9/42 |
| 2004/0246188 | A1 * | 12/2004 | Egashira | G06F 1/1698 343/702 |
| 2019/0044232 | A1 * | 2/2019 | Tseng | H01Q 1/245 |
| 2023/0231310 | A1 * | 7/2023 | Zhang | H01Q 9/045 343/848 |

FOREIGN PATENT DOCUMENTS

| | | | |
|---|---|---|---|
| TW | I788198 B * | 12/2022 | H01Q 9/42 |

* cited by examiner

*Primary Examiner* — Daniel D Chang
(74) *Attorney, Agent, or Firm* — McClure, Qualey & Rodack, LLP

(57) ABSTRACT

An antenna structure includes a coaxial cable, a first radiation element, a second radiation element, a connection radiation element, a third radiation element, and a nonconductive support element. The coaxial cable includes a central conductor and a conductive housing. The central conductor is coupled to a feeding point. The conductive housing is coupled to a first grounding point. The first radiation element is coupled to the feeding point. The first radiation element is adjacent to the conductive housing. The second radiation element is coupled to a second grounding point. The second radiation element is adjacent to the conductive housing. The connection radiation element is coupled between the first radiation element and the second radiation element. The connection radiation element is also coupled to a connection point on the conductive housing. The third radiation element is coupled to the connection radiation element.

21 Claims, 5 Drawing Sheets

ANTENNA STRUCTURE AND ELECTRONIC DEVICE

CROSS REFERENCE TO RELATED APPLICATIONS

This application claims priority of Taiwan Patent Application No. 113102732 filed on Jan. 24, 2024, the entirety of which is incorporated by reference herein.

BACKGROUND OF THE DISCLOSURE

Field of the Disclosure

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and Long Term Evolution (LTE) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient operational bandwidth, it will negatively affect the communication quality of the mobile device in which it is installed. Accordingly, it has become a critical challenge for designers to design a small-size, wideband antenna structure.

BRIEF SUMMARY OF THE DISCLOSURE

In an exemplary embodiment, the disclosure is directed to an antenna structure that includes a coaxial cable, a first radiation element, a second radiation element, a connection radiation element, a third radiation element, and a nonconductive support element. The coaxial cable includes a central conductor and a conductive housing. The central conductor is coupled to a feeding point. The conductive housing is coupled to a first grounding point. The first radiation element is coupled to the feeding point. The first radiation element is adjacent to the conductive housing. The second radiation element is coupled to a second grounding point. The second radiation element is adjacent to the conductive housing. The connection radiation element is coupled between the first radiation element and the second radiation element. The connection radiation element is also coupled to a connection point on the conductive housing. The third radiation element is coupled to the connection radiation element. The coaxial cable, the first radiation element, the second radiation element, the connection radiation element, and the third radiation element are all disposed on the nonconductive support element.

In another exemplary embodiment, the disclosure is directed to an electronic device that includes a metal mechanism element and an antenna structure. The antenna structure includes a coaxial cable, a first radiation element, a second radiation element, a connection radiation element, a third radiation element, and a nonconductive support element. The coaxial cable includes a central conductor and a conductive housing. The central conductor is coupled to a feeding point. The conductive housing is coupled to a first grounding point. The first radiation element is coupled to the feeding point. The first radiation element is adjacent to the conductive housing. The second radiation element is coupled to a second grounding point. The second radiation element is adjacent to the conductive housing. The connection radiation element is coupled between the first radiation element and the second radiation element. The connection radiation element is also coupled to a connection point on the conductive housing. The third radiation element is coupled to the connection radiation element. The coaxial cable, the first radiation element, the second radiation element, the connection radiation element, and the third radiation element are all disposed on the nonconductive support element. The nonconductive support element is disposed on the metal mechanism element.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

Figure 1:
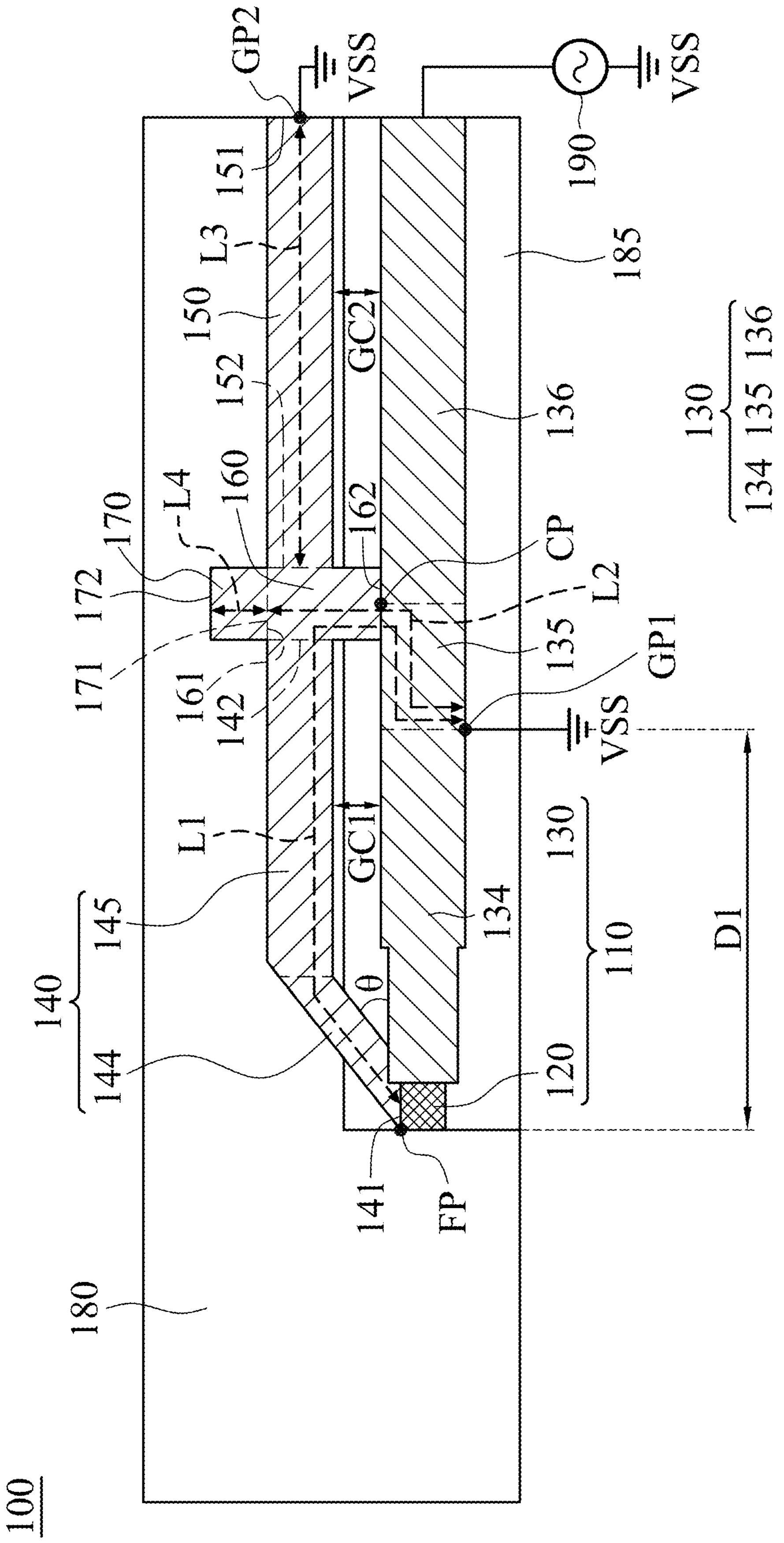
FIG. 1 is a top view of an antenna structure according to an embodiment of the disclosure.

In order to illustrate the purposes, features and advantages of the disclosure, the embodiments and figures of the disclosure are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the disclosure. The antenna structure 100 may be applied to a mobile device, such as a smart phone, a tablet computer, or a notebook computer. As shown in FIG. 1, the antenna structure 100 includes a coaxial cable 110, a first radiation element 140, a second radiation element 150, a connection radiation element 160, a third radiation element 170, and a nonconductive support element 180. The first radiation element 140, the second radiation element 150, the connection radiation element 160, and the third radiation element 170 may all be made of metal materials, such as copper, silver, aluminum, iron, or their alloys.

The coaxial cable 110 includes a central conductor 120 and a conductive housing 130. The central conductor 120 is coupled to a feeding point FP. The conductive housing 130 is coupled to a first grounding point GP1. The central conductor 120 may be further coupled to a positive electrode of a signal source 190, and a negative electrode of the signal source 190 may be coupled to a ground voltage VSS. For example, the signal source 190 may be an RF (Radio Frequency) module for exciting the antenna structure 100. In addition, the first grounding point GP1 may also be coupled to the ground voltage VSS. It should be noted that at least one portion of the coaxial cable 110 is used as a radiator of the antenna structure 100 because the first grounding point GP1 is arranged away from the feeding point FP.

The first radiation element 140 is adjacent to the conductive housing 130. Specifically, the first radiation element 140 has a first end 141 and a second end 142. The first end 141 of the first radiation element 140 is coupled to the feeding point FP. In some embodiments, the first radiation element 140 includes a first segment 144 adjacent to the first end 141 and a second segment 145 adjacent to the second end 142. The first segment 144 and the second segment 145 are coupled to each other. There may be an angle θ formed between the first segment 144 and the coaxial cable 110. The second segment 145 may be substantially parallel to the coaxial cable 110. In other words, among the first radiation element 140, the first segment 144 and the second segment 145 are not parallel to each other. In some embodiments, a first coupling gap GC1 is formed between the second segment 145 and the conductive housing 130. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the first segment 144 substantially has a relatively short straight-line shape, and the second segment 145 substantially has a relatively long straight-line shape, but they are not limited thereto.

The second radiation element 150 is adjacent to the conductive housing 130. Specifically, the second radiation element 150 has a first end 151 and a second end 152. The first end 151 of the second radiation element 150 is coupled to a second grounding point GP2. The second grounding point GP2 may also be coupled to the ground voltage VSS. The second grounding point GP2 may be different from the first grounding point GP1 as mentioned above. In some embodiments, a second coupling gap GC2 is formed between the second radiation element 150 and the conductive housing 130. In some embodiments, the second radiation element 150 substantially has a straight-line shape, which may be substantially parallel to the coaxial cable 110, but it is not limited thereto.

The connection radiation element 160 is coupled between the first radiation element 140 and the second radiation element 150. Specifically, the connection radiation element 160 has a first end 161 and a second end 162. The first end 161 of the connection radiation element 160 is coupled to the second end 142 of the first radiation element 140 and the second end 152 of the second radiation element 150. The second end 162 of the connection radiation element 160 is coupled to a connection point CP on the conductive housing 130. In some embodiments, the connection radiation element 160 substantially has another straight-line shape, which may be substantially perpendicular to both the first radiation element 140 and the second radiation element 150, but it is not limited thereto.

In the coaxial cable 110, the feeding point FP, the first grounding point GP1, and the connection point CP may be substantially arranged in the same straight line. In some embodiments, the first grounding point GP1 is positioned between the feeding point FP and the connection point CP. According to different positions of the feeding point FP, the first grounding point GP1, and the connection point CP, the conductive housing 130 includes a first portion 134, a second portion 135, and a third portion 136 which are coupled with each other. For example, the first portion 134 of the conductive housing 130 may be disposed between the feeding point FP and the first grounding point GP1. The second portion 135 of the conductive housing 130 may be disposed between the first grounding point GP1 and the connection point CP. The third portion 136 of the conductive housing 130 may be disposed between the connection point CP and the signal source 190. It should be noted that there is no plastic skin covering the first portion 134 and the second portion 135 of the conductive housing 130.

The third radiation element 170 has a first end 171 and a second end 172. The first end 171 of the third radiation element 170 is coupled to the first end 161 of the connection radiation element 160. The second end 172 of the third radiation element 170 is an open end. For example, the second end 172 of the third radiation element 170 may substantially extend away from the coaxial cable 110. In some embodiments, the third radiation element 170 substantially has a rectangular shape or a square shape. Furthermore, the combination of the second segment 145, the second radiation element 150, the connection radiation element 160, and the third radiation element 170 may substantially have a cross shape, but it is not limited thereto.

For example, the nonconductive support element 180 may be made of a plastic material. The shape and style of the nonconductive support element 180 are not limited in the disclosure. The coaxial cable 110, the first radiation element 140, the second radiation element 150, the connection radiation element 160, and the third radiation element 170 are all disposed on the nonconductive support element 180. In some embodiments, the nonconductive support element 180 further has a corner notch 185 for accommodating the coaxial cable 110, but it is not limited thereto. Such an embedded coaxial cable 110 can help to reduce the overall size of the antenna structure 100.

Figure 2:
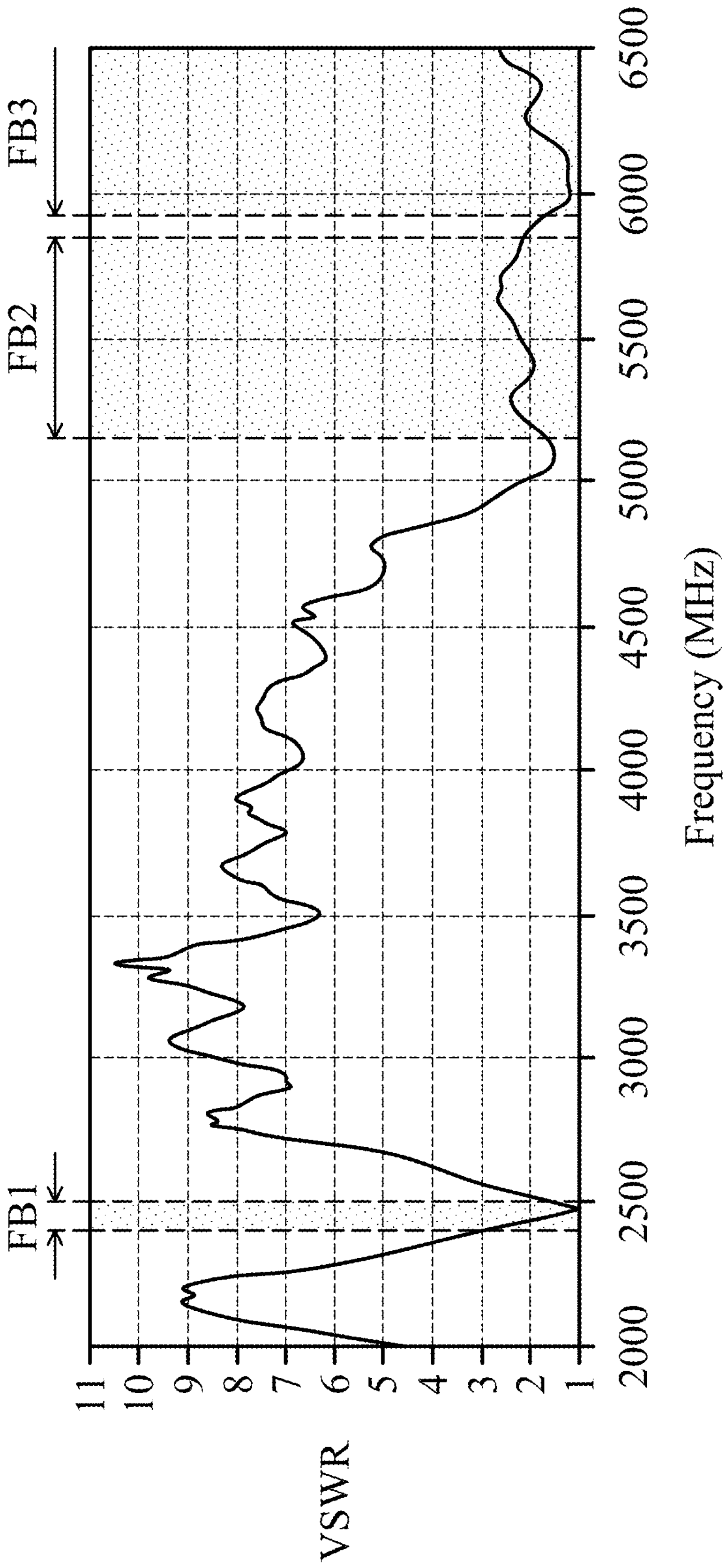
FIG. 2 is a diagram of VSWR (Voltage Standing Wave Ratio) of an antenna structure according to an embodiment of the disclosure.

FIG. 2 is a diagram of VSWR (Voltage Standing Wave Ratio) of the antenna structure 100 according to an embodiment of the disclosure. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 100 can support at least the wideband operations of WLAN (Wireless Local Area Networks), Wi-Fi 6E, and Wi-Fi 7.

In some embodiments, the operational principles of the antenna structure 100 will be described as follows. The first radiation element 140, the connection radiation element 160, and the second portion 135 of the conductive housing 130 can be excited to generate a fundamental resonant mode, thereby forming the first frequency band FB1. The connection radiation element 160 and the second portion 135 of the conductive housing 130 can be excited to generate the second frequency band FB2. Furthermore, the first radiation element 140, the connection radiation element 160, and the second portion 135 of the conductive housing 130 can be excited to generate a higher-order resonant mode, thereby forming the third frequency band FB3. The impedance matching of the first frequency band FB1 can be appropriately adjusted by changing the position of the first grounding point GP1. Also, the second radiation element 150 can be configured to fine-tune the impedance matching of the first frequency band FB1 and the third frequency band FB3. The third radiation element 170 can be configured to fine-tune the impedance matching of the second frequency band FB2.

Figure 3:
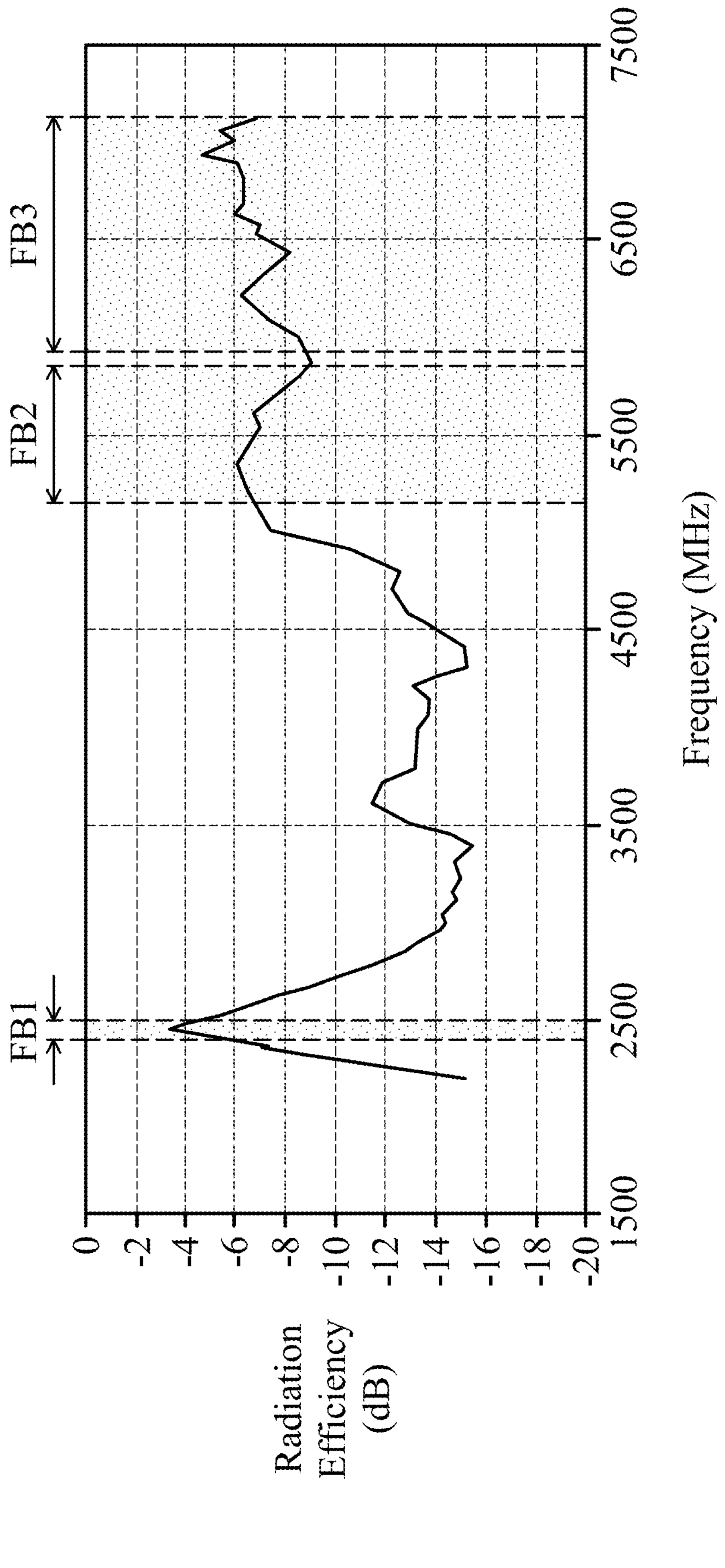
FIG. 3 is a diagram of radiation efficiency of an antenna structure according to an embodiment of the disclosure.

FIG. 3 is a diagram of the radiation efficiency of the antenna structure 100 according to an embodiment of the disclosure. The horizontal axis represents the operational frequency (MHz), and the vertical axis represents the radiation efficiency (dB). According to the measurement of FIG. 3, the radiation efficiency of the antenna structure 100 can reach 8 dB or higher within the first frequency band FB1, the second frequency band FB2, and the third frequency band FB3 as mentioned above. It can meet the requirements of practical applications of general mobile communication.

In some embodiments, the element sizes of the antenna structure 100 will be described as follows. In the coaxial cable 110, the distance D1 between the first grounding point GP1 and the feeding point FP may be from 18 mm to 22 mm, such as about 20 mm. The total length L1 of the first radiation element 140, the connection radiation element 160, and the second portion 135 of the conductive housing 130 may be from 0.2 to 0.25 wavelength ($\lambda/5 \sim \lambda/4$) of the first frequency band FB1 of the antenna structure 100, such as about 0.22 wavelength ($0.22\lambda$). The total length L2 of the connection radiation element 160 and the second portion 135 of the conductive housing 130 may be substantially equal to 0.25 wavelength ($\lambda/4$) of the second frequency band FB2 of the antenna structure 100. The length L3 of the second radiation element 150 may be from 13 mm to 17 mm, such as about 15 mm. The length L4 of the third radiation element 170 may be from 2 mm to 3 mm. The width of the first coupling gap GC1 may be shorter than or equal to 2 mm. The width of the second coupling gap GC2 may be shorter than or equal to 2 mm. The angle $\theta$ may be from 10 to 80 degrees, such as about 30, 45, or 60 degrees. The above ranges of element sizes are calculated and obtained according to many experimental results, and they help to optimize the operational bandwidth, the radiation efficiency, and the impedance matching of the antenna structure 100.

The following embodiments will introduce different configurations and detail structural features of the antenna structure 100. It should be understood that these figures and descriptions are merely exemplary, rather than limitations of the disclosure.

Figure 4:
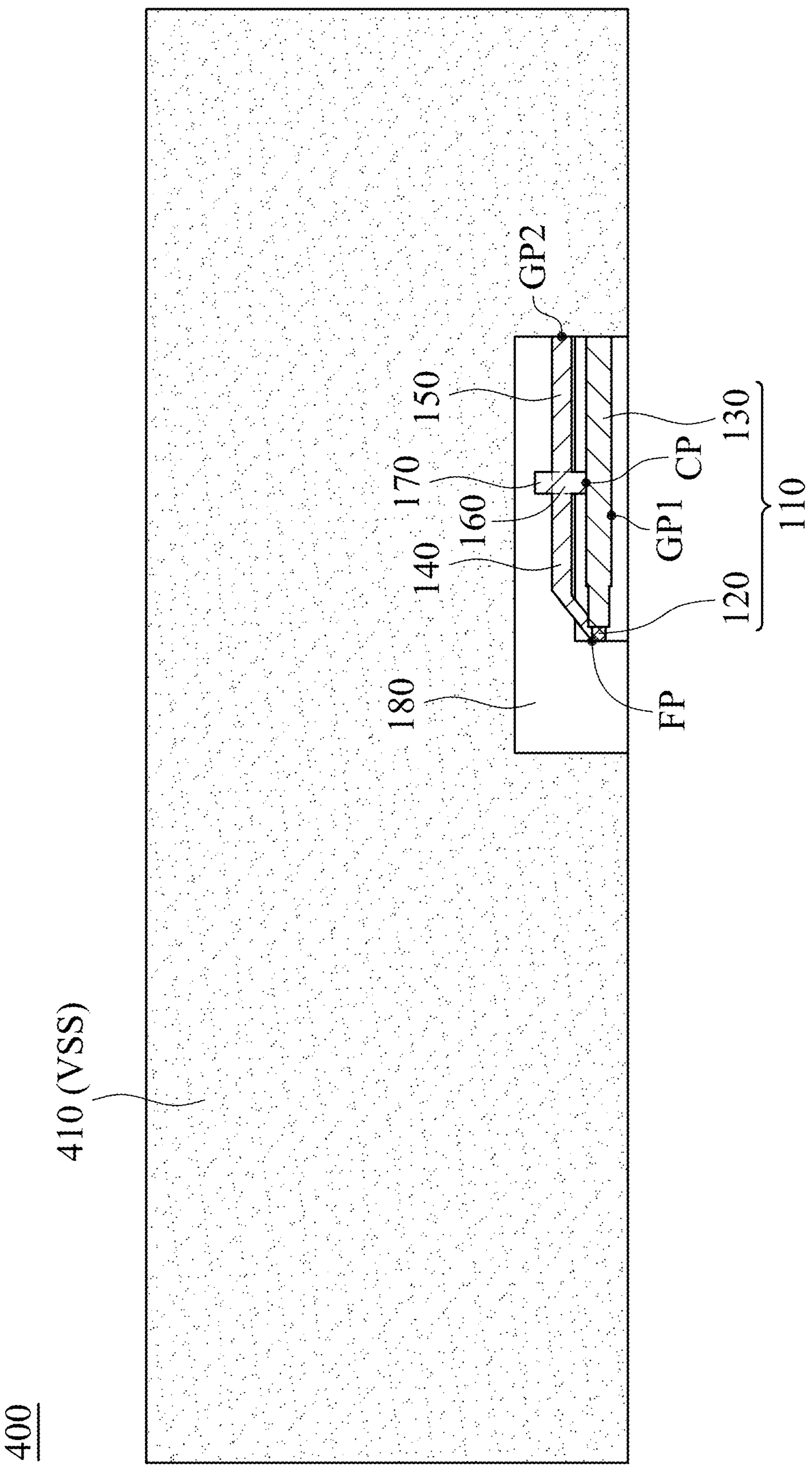
FIG. 4 is a top view of an electronic device according to an embodiment of the disclosure.

FIG. 4 is a top view of an electronic device 400 according to an embodiment of the disclosure. FIG. 4 is similar to FIG. 1. In the embodiment of FIG. 4, besides the antenna structure 100 as mentioned above, the electronic device 400 further includes a metal mechanism element 410, and the nonconductive support element 180 is disposed on the metal mechanism element 410. It should be noted that the metal mechanism element 410 is configured to provide the ground voltage VSS. The first grounding point GP1 and the second grounding point GP2 as mentioned above are also coupled to the metal mechanism element 410. For example, if the electronic device 400 is a notebook computer, the metal mechanism element 410 may be a metal back cover of the notebook computer. The electronic device 400 can support the functions of wireless communication and wideband operations because there is the aforementioned antenna structure 100. Other features of the electronic device 400 of FIG. 4 are similar to those of the antenna structure 100 of FIG. 1. Accordingly, the two embodiments can achieve similar levels of performance.

Figure 5:
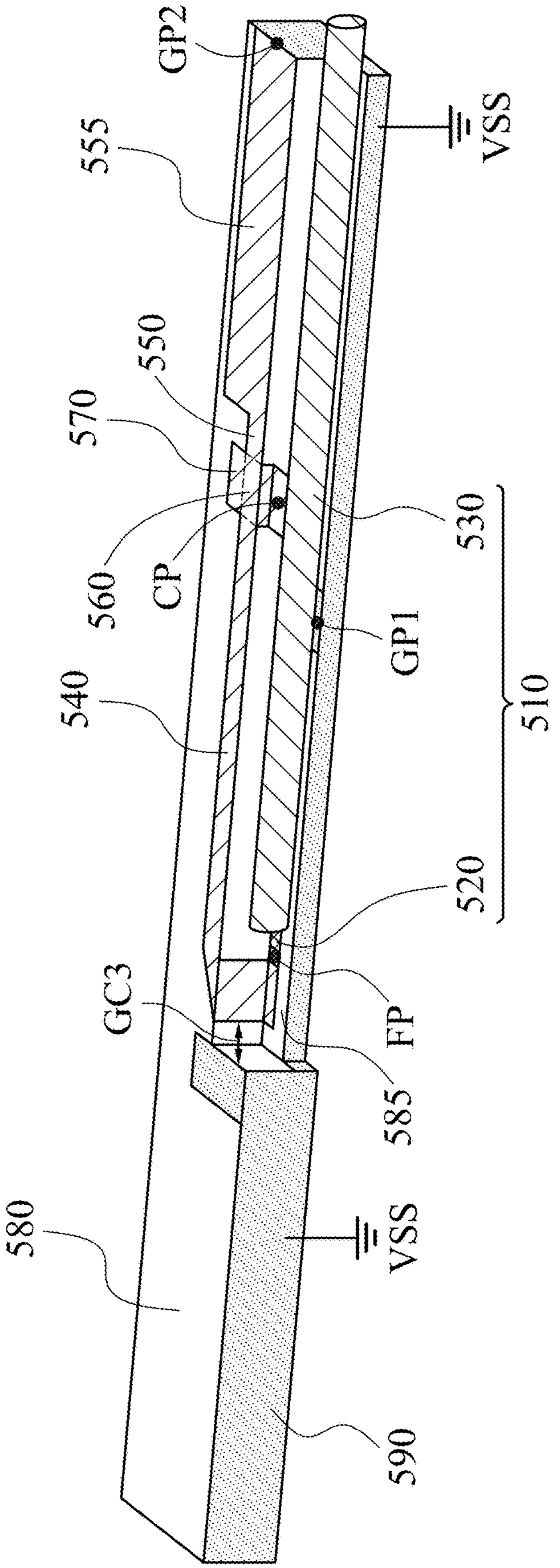
FIG. 5 is a perspective view of an antenna structure according to an embodiment of the disclosure.

FIG. 5 is a perspective view of an antenna structure 500 according to an embodiment of the disclosure. FIG. 5 is similar to FIG. 1. In the embodiment of FIG. 5, the antenna structure 500 includes a coaxial cable 510, a first radiation element 540, a second radiation element 550, a connection radiation element 560, a third radiation element 570, and a nonconductive support element 580. The coaxial cable 510 includes a central conductor 520 and a conductive housing 530. Specifically, the nonconductive support element 580 further has a corner notch 585 for accommodating the coaxial cable 510. The second radiation element 550 further includes a rectangular widening portion 555 adjacent to the second grounding point GP2, so as to increase the operational bandwidth of the antenna structure 500. It should be understood that the detailed structures of the first radiation element 540, the second radiation element 550, the connection radiation element 560, and the third radiation element 570 may be slightly adjusted, thereby forming the 3D (Three-Dimensional) antenna structure 500.

In addition, the antenna structure 500 further includes a metal cavity 590 distributed over the nonconductive support element 580. The metal cavity 590 is also coupled to the ground voltage VSS (or the metal mechanism element 410 of FIG. 4). The metal cavity 590 is adjacent to the first radiation element 540. A third coupling gap GC3 is formed between the metal cavity 590 and the first radiation element 540. For example, the width of the third coupling gap GC3 may be shorter than or equal to 2 mm. The shape and style of the metal cavity 590 are not limited in the disclosure. In some embodiments, the metal cavity 590 is distributed on five different surfaces of the nonconductive support element 580. According to practical measurements, the incorporation of the metal cavity 590 can help to prevent the antenna structure 500 from being negatively affected by environmental noise. Other features of the antenna structure 500 of FIG. 5 are similar to those of the antenna structure 100 of FIG. 1. Accordingly, the two embodiments can achieve similar levels of performance.

The disclosure proposes a novel antenna structure and a novel electronic device. In comparison to the conventional design, the disclosure has at least the advantages of small size, wide bandwidth, high radiation efficiency, and low noise interference. Therefore, the disclosure is suitable for application in a variety of communication devices.

Note that the above element sizes, element shapes, and frequency ranges are not limitations of the disclosure. An antenna designer can fine-tune these settings or values in order to meet specific requirements. It should be understood that the antenna structure and the electronic device of the disclosure are not limited to the configurations depicted in FIGS. 1-5. The disclosure may merely include any one or more features of any one or more embodiments of FIGS. 1-5. In other words, not all of the features displayed in the figures should be implemented in the antenna structure and the electronic device of the disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a coaxial cable, comprising a central conductor and a conductive housing, wherein the central conductor is coupled to a feeding point, and the conductive housing is coupled to a first grounding point;

a first radiation element, coupled to the feeding point, wherein the first radiation element is adjacent to the conductive housing;

a second radiation element, coupled to a second grounding point, wherein the second radiation element is adjacent to the conductive housing;

a connection radiation element, coupled between the first radiation element and the second radiation element, wherein the connection radiation element is coupled to a connection point on the conductive housing;

a third radiation element, coupled to the connection radiation element; and a nonconductive support element, wherein the coaxial cable, the first radiation element, the second radiation element, the connection radiation element, and the third radiation element are disposed on the nonconductive support element;

wherein the first radiation element comprises a first segment and a second segment coupled to each other, an angle is formed between the first segment and the coaxial cable, and the second segment is substantially parallel to the coaxial cable.

2. The antenna structure as claimed in claim 1, wherein the first grounding point is positioned between the feeding point and the connection point.

3. The antenna structure as claimed in claim 1, wherein a distance between the first grounding point and the feeding point is from 18 mm to 22 mm.

4. The antenna structure as claimed in claim 1, wherein the conductive housing comprises a first portion and a second portion, the first portion is disposed between the feeding point and the first grounding point, and the second portion is disposed between the first grounding point and the connection point.

5. The antenna structure as claimed in claim 4, wherein the antenna structure covers a first frequency band, a second frequency band, and a third frequency band.

6. The antenna structure as claimed in claim 5, wherein the first frequency band is from 2400 MHz to 2500 MHz, the second frequency band is from 5150 MHz to 5850 MHZ, and the third frequency band is from 5925 MHz to 7125 MHz.

7. The antenna structure as claimed in claim 5, wherein the first radiation element, the connection radiation element, and the second portion of the conductive housing are excited to generate the first frequency band and the third frequency band.

8. The antenna structure as claimed in claim 5, wherein a total length of the first radiation element, the connection radiation element, and the second portion of the conductive housing is from 0.2 to 0.25 wavelength of the first frequency band.

9. The antenna structure as claimed in claim 5, wherein the connection radiation element and the second portion of the conductive housing are excited to generate the second frequency band.

10. The antenna structure as claimed in claim 5, wherein a total length of the connection radiation element and the second portion of the conductive housing is substantially equal to 0.25 wavelength of the second frequency band.

11. The antenna structure as claimed in claim 1, wherein a combination of the second segment, the second radiation element, the connection radiation element, and the third radiation element substantially has a cross shape.

12. The antenna structure as claimed in claim 1, wherein a first coupling gap is formed between the second segment and the conductive housing, and a width of the first coupling gap is shorter than or equal to 2 mm.

13. The antenna structure as claimed in claim 1, wherein a second coupling gap is formed between the second radiation element and the conductive housing, and a width of the second coupling gap is shorter than or equal to 2 mm.

14. The antenna structure as claimed in claim 1, further comprising:

a metal cavity, distributed over the nonconductive support element, wherein the metal cavity is adjacent to the first radiation element.

15. The antenna structure as claimed in claim 14, wherein a third coupling gap is formed between the metal cavity and the first radiation element, and a width of the third coupling gap is shorter than or equal to 2 mm.

16. The antenna structure as claimed in claim 1, wherein the nonconductive support element further has a corner notch for accommodating the coaxial cable.

17. The antenna structure as claimed in claim 1, wherein the second radiation element further comprises a rectangular widening portion.

18. The antenna structure as claimed in claim 1, wherein the angle is from 10 to 80 degrees.

19. An electronic device, comprising:

a metal mechanism element; and an antenna structure, comprising:

a coaxial cable, comprising a central conductor and a conductive housing, wherein the central conductor is coupled to a feeding point, and the conductive housing is coupled to a first grounding point;

a first radiation element, coupled to the feeding point, wherein the first radiation element is adjacent to the conductive housing;

a second radiation element, coupled to a second grounding point, wherein the second radiation element is adjacent to the conductive housing;

a connection radiation element, coupled between the first radiation element and the second radiation element, wherein the connection radiation element is coupled to a connection point on the conductive housing;

a third radiation element, coupled to the connection radiation element; and a nonconductive support element, wherein the coaxial cable, the first radiation element, the second radiation element, the connection radiation element, and the third radiation element are disposed on the nonconductive support element;

wherein the nonconductive support element is disposed on the metal mechanism element;

wherein the first radiation element comprises a first segment and a second segment coupled to each other, an angle is formed between the first segment and the coaxial cable, and the second segment is substantially parallel to the coaxial cable.

20. The electronic device as claimed in claim 19, wherein the first grounding point and the second grounding point are further coupled to the metal mechanism element.

21. The electronic device as claimed in claim 19, wherein the angle is from 10 to 80 degrees.

* * * * *